(12) United States Patent
Chang et al.

(10) Patent No.: US 8,266,509 B2
(45) Date of Patent: *Sep. 11, 2012

(54) EDGE INCREMENTAL REDUNDANCY MEMORY STRUCTURE AND MEMORY MANAGEMENT

(75) Inventors: Li Fung Chang, Holmdel, NJ (US); Yongqian Wang, Woodbridge, NJ (US)

(73) Assignee: Broadcom Corporation, Irvine, CA (US)

(*) Notice: Subject to any disclaimer, the term of this patent is extended or adjusted under 35 U.S.C. 154(b) by 510 days.

This patent is subject to a terminal disclaimer.

(21) Appl. No.: 12/507,835

(22) Filed: Jul. 23, 2009

(65) Prior Publication Data

US 2009/0287977 A1    Nov. 19, 2009

Related U.S. Application Data

(63) Continuation of application No. 11/843,903, filed on Aug. 23, 2007, now Pat. No. 7,584,398, which is a continuation of application No. 10/731,804, filed on Dec. 9, 2003, now Pat. No. 7,272,768.

(60) Provisional application No. 60/478,922, filed on Jun. 16, 2003, provisional application No. 60/431,940, filed on Dec. 9, 2002.

(51) Int. Cl.
    *H03M 13/03* (2006.01)
(52) U.S. Cl. ............... 714/790; 714/746; 714/751
(58) Field of Classification Search ............ 714/790, 714/751, 746

See application file for complete search history.

(56) References Cited

U.S. PATENT DOCUMENTS

| | | | |
|---|---|---|---|
| 7,075,917 B2 * | 7/2006 | Herrmann | 370/349 |
| 7,089,574 B2 * | 8/2006 | Choi et al. | 720/739 |
| 7,302,628 B2 * | 11/2007 | Huang et al. | 714/751 |

* cited by examiner

*Primary Examiner* — Fritz Alphonse
(74) *Attorney, Agent, or Firm* — Garlick & Markison; Holly L. Rudnick

(57) ABSTRACT

A wireless device for implementing Incremental Redundancy (IR) operations includes an IR memory dedicated to storing data related to the IR operations. The IR memory includes a Type I IR memory adapted to store IR status information of a Radio Link Control (RLC) data block and a Type II IR memory adapted to store the RLC data block.

20 Claims, 11 Drawing Sheets

MCS 1-3 => RLC block/split RLC Block per four RF bursts

| HDR | RLC Block/Split RLC Block |

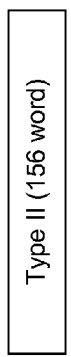

MCS 1-3 (GMSK), 372 soft symbol bits per RLC block/split RLC block => 93 words => one Type II IR Memory Location

| Type II (156 word) |

FIG. 7A

MCS 4 => RLC Block per four RF bursts

| HDR | RLC Block |

MCS 4 (GMSK), 372 soft symbol bits per RLC block => 93 words => one Type II IR Memory Location

| Type II (156 word) |

FIG. 7B

MCS 5-6 => RLC Block per four RF bursts

| HDR | RLC Block |

MCS 5-6 (8-PSK), 1248 soft symbol bits per RLC block => 312 words => two Type II IR Memory Locations

| Type II (156 word) | Type II (156 word) |

FIG. 7C

MCS 7-9 => two RLC Blocks per four RF bursts

| HDR | RLC Block 1 | RLC Block 2 |

MCS 7-9 (8-PSK), 612 soft symbol bits per RLC block => 153 words => one Type II IR Memory Location

| Type II (156 word) |

FIG. 7D

EDGE INCREMENTAL REDUNDANCY MEMORY STRUCTURE AND MEMORY MANAGEMENT

CROSS REFERENCES TO RELATED APPLICATIONS

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:

1. U.S. Utility application Ser. No. 11/843,903, entitled "EDGE Incremental Redundancy Memory Structure and Memory Management," filed Aug. 23, 2007 and now issued as U.S. Pat. No. 7,584,398, which claims priority pursuant to 35 U.S.C. §120 to the following U.S. Utility patent application which is hereby incorporated herein by reference in its entirety and made part of the present U.S. Utility patent application for all purposes:
   a. U.S. Utility patent application Ser. No. 10/731,804, entitled "EDGE Incremental Redundancy Memory Structure and Memory Management", filed Dec. 9, 2003 and now issued as U.S. Pat. No. 7,272,768, which claims priority pursuant to 35 U.S.C. §119(e) to the following U.S. Provisional Patent Applications which are hereby incorporated herein by reference in their entirety and made part of the present U.S. Utility patent application for all purposes:
      (i) U.S. Provisional Application Ser. No. 60/431,940, filed Dec. 9, 2002; and
      (ii) U.S. Provisional Patent Application Ser. No. 60/478,922, filed Jun. 16, 2003

BACKGROUND

2. Technical Field

The present invention relates generally to cellular wireless communication systems; and more particularly to the processing of data communications received by a wireless terminal in such a cellular wireless communication system.

3. Related Art

Cellular wireless communication systems support wireless communication services in many populated areas of the world. While cellular wireless communication systems were initially constructed to service voice communications, they are now called upon to support data communications as well. The demand for data communication services has exploded with the acceptance and widespread use of the Internet. While data communications have historically been serviced via wired connections, cellular wireless users now demand that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless communication system data communications will only increase with time. Thus, cellular wireless communication systems are currently being created/modified to service these burgeoning data communication demands.

Cellular wireless networks include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its cell/sectors. A BSC coupled to the base station routes voice communications between the MSC and the serving base station. The MSC routes the voice communication to another MSC or to the PSTN. BSCs route data communications between a servicing base station and a packet data network that may include or couple to the Internet. Transmissions from base stations to wireless terminals are referred to as "forward link" transmissions while transmissions from wireless terminals to base stations are referred to as "reverse link" transmissions. The volume of data transmitted on the forward link typically exceeds the volume of data transmitted on the reverse link. Such is the case because data users typically issue commands to request data from data sources, e.g., web servers, and the web servers provide the data to the wireless terminals.

Wireless links between base stations and their serviced wireless terminals typically operate according to one (or more) of a plurality of operating standards. These operating standards define the manner in which the wireless link may be allocated, setup, serviced and torn down. One popular cellular standard is the Global System for Mobile telecommunications (GSM) standard. The GSM standard, or simply GSM, is predominant in Europe and is in use around the globe. While GSM originally serviced only voice communications, it has been modified to also service data communications. GSM General Packet Radio Service (GPRS) operations and the Enhanced Data rates for GSM (or Global) Evolution (EDGE) operations coexist with GSM by sharing the channel bandwidth, slot structure, and slot timing of the GSM standard. The GPRS operations and the EDGE operations may also serve as migration paths for other standards as well, e.g., IS-136 and Pacific Digital Cellular (PDC).

In order for EDGE to provide increased data rates within a 200 KHz GSM channel, it employs a higher order modulation, 8-PSK (octal phase shift keying), in addition to GSM's standard Gaussian Minimum Shift Keying (GMSK) modulation. EDGE allows for nine different (autonomously and rapidly selectable) air interface formats, known as Modulation and Coding schemes (MCSs), with varying degrees of error control protection. Low MCS modes, (MCS 1-4) use GMSK (low data rate) while high MCS modes (MCS 5-9) use 8-PSK (high data rate) modulation for over the air transmissions, depending upon the instantaneous demands of the application.

EDGE uses the higher order 8-PSK and the GMSK modulations and a family of MCSs for each GSM radio channel time slot, so that each user connection may adaptively determine the best MCS setting for the particular radio propagation conditions and data access requirements of the user. In addition, the "best" air interface mode is enhanced with a technique called incremental redundancy (IR), whereby packets are transmitted first with initially selected MCS mode and puncturing, and then subsequent packets are transmitted with additional redundancy using differing puncturing patterns and potentially different MCS modes within a common MCS family. Rapid feedback between the base station and wireless terminal may restore the previous acceptable air interface state, which is presumably at an acceptable level but with minimum required coding and with minimum bandwidth and power drain.

The processing and memory requirements for IR service are severe. Decoding is performed for each received block and, if the decoding is not successful, the received block must be stored until it is combined with a subsequently received block. This storage and combination process may be repeated for a number of iterations. Because IR operations may be in process for a large number of blocks, the storage and indexing requirements for IR may be significant.

Traditionally, the Radio Link Control protocol layer (RLC) was responsible for initiating retransmission of a block while the Physical Layer (PHY) was responsible for decoding. Typically, the RLC and the PHY were implemented in separate processing devices, e.g., a first processor implementing the RLC, e.g., RISC processor, and a second processor implementing the PHY, e.g. DSP. Many of the operations supported by the wireless terminal justified this split in processing duties. However, when IR is implemented, the split in processing duties burdens each of the processors with messaging and data sharing operations simply in support of IR. These processing and memory requirements adversely affect the performance of wireless terminals servicing EDGE. Thus, there exists a need in the art for improved performance in supporting EDGE IR.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIGS. 7A, 7B, 7C, and 7D are block diagrams illustrating the manner in which RLC blocks and segmented RLC blocks are stored in Type II IR memory according to one aspect of the present invention;

DETAILED DESCRIPTION OF THE DRAWINGS

Figure 1:
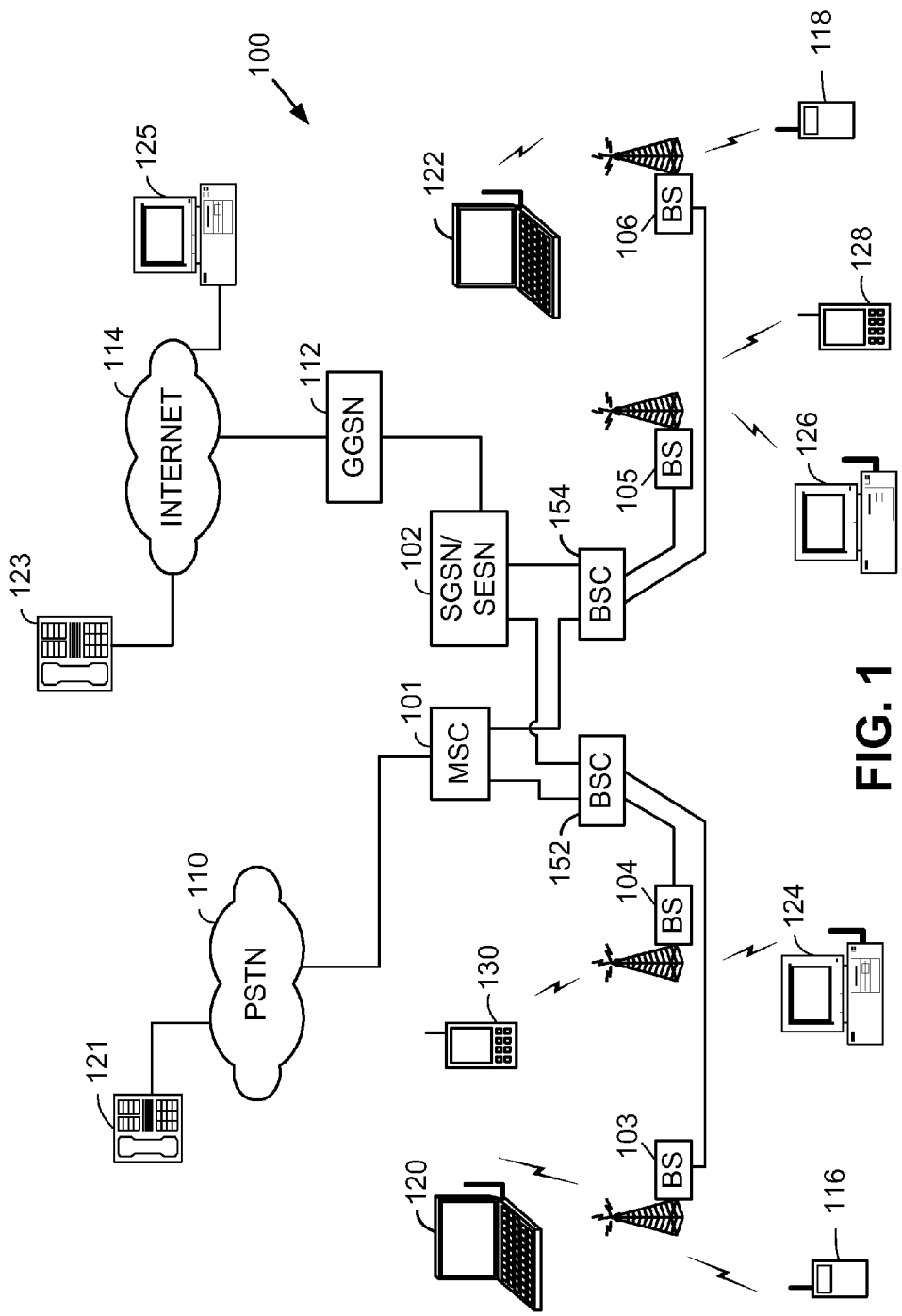
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating according to the present invention. The cellular wireless communication system 100 includes a Mobile Switching Center (MSC) 101, Serving GPRS Support Node/Serving EDGE Support Node (SGSN/SESN) 102, base station controllers (BSCs) 152 and 154, and base stations 103, 104, 105, and 106. The SGSN/SESN 102 couples to the Internet 114 via a GPRS Gateway Support Node (GGSN) 112. A conventional voice terminal 121 couples to the PSTN 110. A Voice over Internet Protocol (VoIP) terminal 123 and a personal computer 125 couple to the Internet 114. The MSC 101 couples to the Public Switched Telephone Network (PSTN) 110.

Each of the base stations 103-106 services a cell/set of sectors within which it supports wireless communications. Wireless links that include both forward link components and reverse link components support wireless communications between the base stations and their serviced wireless terminals. These wireless links support digital data communications, VoIP communications, and other digital multimedia communications. The cellular wireless communication system 100 may also be backward compatible in supporting analog operations as well. The cellular wireless communication system 100 supports the Global System for Mobile telecommunications (GSM) standard and also the Enhanced Data rates for GSM (or Global) Evolution (EDGE) extension thereof. The cellular wireless communication system 100 may also support the GSM General Packet Radio Service (GPRS) extension to GSM. However, the present invention is also applicable to other standards as well, e.g., TDMA standards, CDMA standards, etc. In general, the teachings of the present invention apply to digital communications that combine Automatic Repeat ReQuest (ARQ) operations at Layer 2, e.g., LINK/MAC layer with variable coding/decoding operations at Layer 1 (PHY).

Wireless terminals 116, 118, 120, 122, 124, 126, 128, and 130 couple to the cellular wireless communication system 100 via wireless links with the base stations 103-106. As illustrated, wireless terminals may include cellular telephones 116 and 118, laptop computers 120 and 122, desktop computers 124 and 126, and data terminals 128 and 130. However, the cellular wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate requirements while the upload data-rate requirements are not as severe. Some or all of the wireless terminals 116-130 are therefore enabled to support the EDGE operating standard. These wireless terminals 116-130 also support the GSM standard and may support the GPRS standard. In particular, the wireless terminals 116-130 support Incremental Redundancy (IR) operations according to the present invention.

Figure 2:
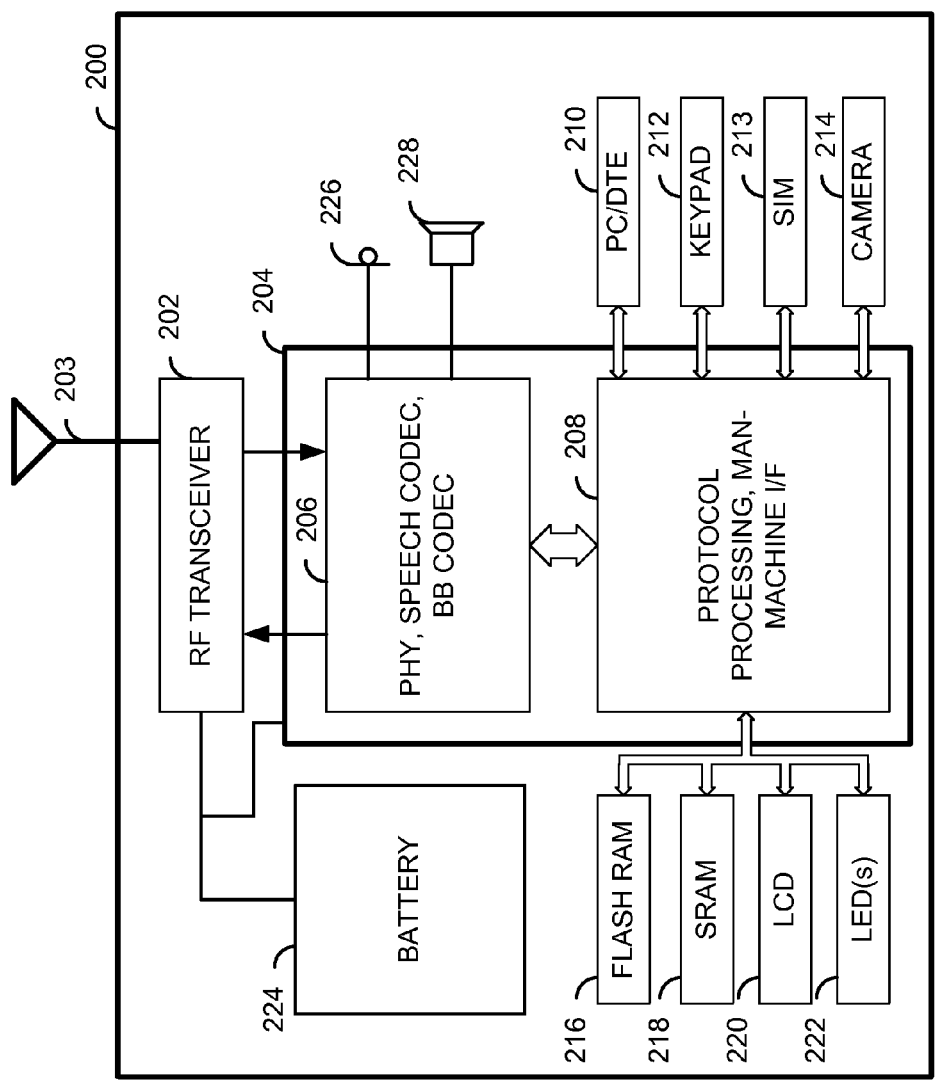
FIG. 2 is a block diagram functionally illustrating a wireless terminal constructed according to the present invention.

FIG. 2 is a block diagram functionally illustrating a wireless terminal 200 constructed according to the present invention. The wireless terminal 200 of FIG. 2 includes an RF transceiver 202, digital processing components 204, and various other components contained within a housing. The digital processing components 204 includes two main functional components, a physical layer processing, speech COder/DECoder (CODEC), and baseband CODEC functional block 206 and a protocol processing, man-machine interface functional block 208. A Digital Signal Processor (DSP) is the major component of the physical layer processing, speech COder/DECoder (CODEC), and baseband CODEC functional block 206 while a microprocessor, e.g., Reduced Instruction Set Computing (RISC) processor, is the major component of the protocol processing, man-machine interface functional block 208. The DSP may also be referred to as a Radio Interface Processor (RIP) while the RISC processor may be referred to as a system processor. However, these naming conventions are not to be taken as limiting the functions of these components.

The RF transceiver 202 couples to an antenna 203, to the digital processing components 204, and also to a battery 224 that powers all components of the wireless terminal 200. The physical layer processing, speech COder/DECoder (CODEC), and baseband CODEC functional block 206 couples to the protocol processing, man-machine interface functional block 208 and to a coupled microphone 226 and speaker 228. The protocol processing, man-machine interface functional block 208 couples to a Personal Computing/Data Terminal Equipment interface 210, a keypad 212, a Subscriber Identification Module (SIM) port 213, a camera 214, a flash RAM 216, an SRAM 218, a LCD 220, and LED(s) 222. The camera 214 and LCD 220 may support either/both still pictures and moving pictures. Thus, the wireless terminal 200 of FIG. 2 supports video services as well as audio services via the cellular network.

Figure 3:
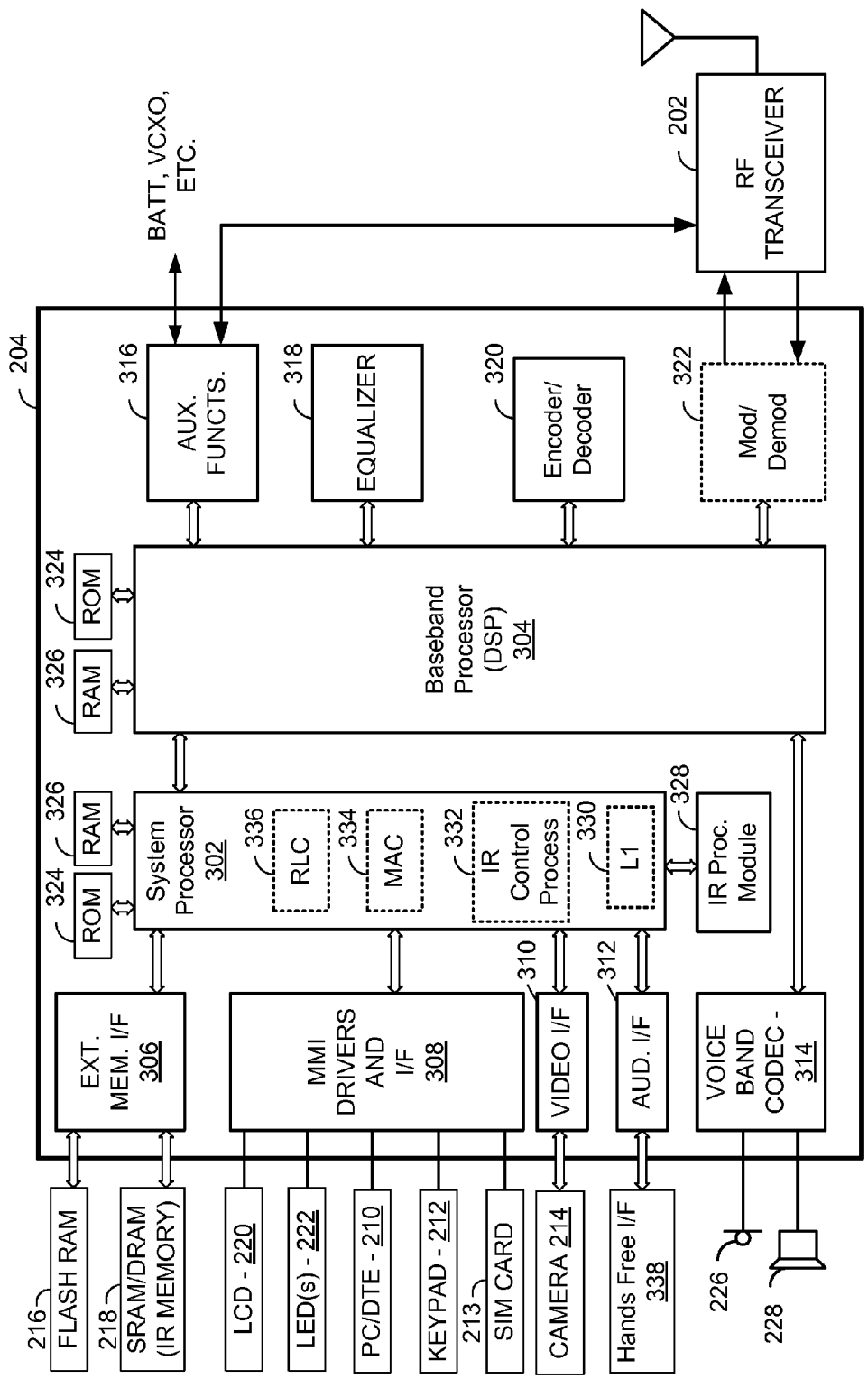
FIG. 3 is a block diagram illustrating in more detail the wireless terminal of FIG. 2, with particular emphasis on the digital processing components of the wireless terminal.

FIG. 3 is a block diagram illustrating in more detail the wireless terminal of FIG. 2, with particular emphasis on the digital processing components of the wireless terminal. The digital processing components 204 include a system processor 302, a baseband processor 304, and a plurality of supporting components. The supporting components include an external memory interface 306, Man-Machine-Interface (MMI) drivers and I/F 308, a video I/F 310, an audio I/F 312, a voice band CODEC 314, auxiliary functions 316, a modulator/demodulator 322, ROM 324, RAM 326 and a plurality of processing modules. In some embodiments, the modulator/demodulator 322 is not a separate structural component with these functions being performed internal to the baseband processor 304. A Hands Free Interface (I/F) supports hands free use of the wireless terminal.

The processing modules are also referred to herein as accelerators, co-processors, processing modules, or otherwise, and include auxiliary functions 316, an equalizer 318, an encoder/decoder 320, and an Incremental Redundancy (IR) processing module 328. The interconnection of FIG. 3 is one example of a manner in which these components may be interconnected. Other embodiments support additional/alternate couplings. Such coupling may be direct, indirect, and/or may be via one or more intermediary components.

RAM and ROM service both the system processor 302 and the baseband processor 304. Both the system processor 302 and the baseband processor 304 may couple to shared RAM 326 and ROM 324, couple to separate RAM, coupled to separate ROM, couple to multiple RAM blocks, some shared, some not shared, or may be served in a differing manner by the memory. In one particular embodiment, the system processor 302 and the baseband processor 304 coupled to respective separate RAMs and ROMs and also couple to a shared RAM that services control and data transfers between the devices. The processing modules 316, 318, 320, 322, and 328 may coupled as illustrated in FIG. 3 but may also coupled in other manners, such as the manner shown in FIGS. 5A and/or 5B in differing embodiments.

The system processor 302 services at least a portion of a serviced protocol stack, e.g., GSM/GPRS/EDGE protocol stack. In particular the system processor 302 services Layer 1 (L1) operations 330, a portion of Incremental Redundancy (IR) GSM protocol stack operations 332 (referred to as "IR control process"), Medium Access Control (MAC) operations 334, and Radio Link Control (RLC) operations 336. These operations will not be further described herein except as how they relate to the present invention. The baseband processor 304 in combination with the modulator/demodulator 322, RF transceiver, equalizer 318, and/or encoder/decoder 320 service the Physical Layer (PHY) operations performed by the digital processing components 204.

As is known, EDGE supports both selective repeat Type I ARQ operations and IR Type II ARQ operations for data protection. With IR operations, when a first transmitted data block is in error, a re-transmitted data block will be sent. The re-transmitted data block may have a same coding/puncturing pattern or a differing coding/puncturing pattern as compared to the first data block. Soft combining of the data blocks is performed and decoding and error checking of the combined data block (de-punctured) is then attempted. Multiple retransmission/combining/decoding operations may be attempted before the IR process terminates. IR operations are successful as compared to simple retransmissions because coding schemes/puncturing patterns of each transmission are complementary to one other.

In designing a wireless device to support IR operations, a critical issue is IR memory size and processing time. The embodiments of the present invention are directed to IR memory organization and also IR processing. One particular embodiment of the present invention supports downlink transmissions for up to four time slots using the IR process. The processing and memory management embodiments of the present invention minimize the number of data moves and maximize the usage of the limited IR memory size (e.g., 1 Mbits) with minimum performance degradation.

Because IR is a joint process of ARQ in the RLC layer 336 and channel coding in the PHY (baseband processor 304 implemented), prior devices often implemented IR command and control at the RLC layer. However, unlike the prior device, a wireless device of the present invention takes advantage of the tight relationship between the IR control process 332 and the L1 process 330 to limit/avoid unnecessary interaction with the RLC 336 during IR processing. Such efficiency is gained by performing substantial portions of the IR operations in the IR processing module 328 that directly interfaces to the system processor 302. The manner in which the IR control process 332 and the IR processing module 328 supports these operations will be described in detail with reference to FIGS. 5A though 10.

Figure 4:
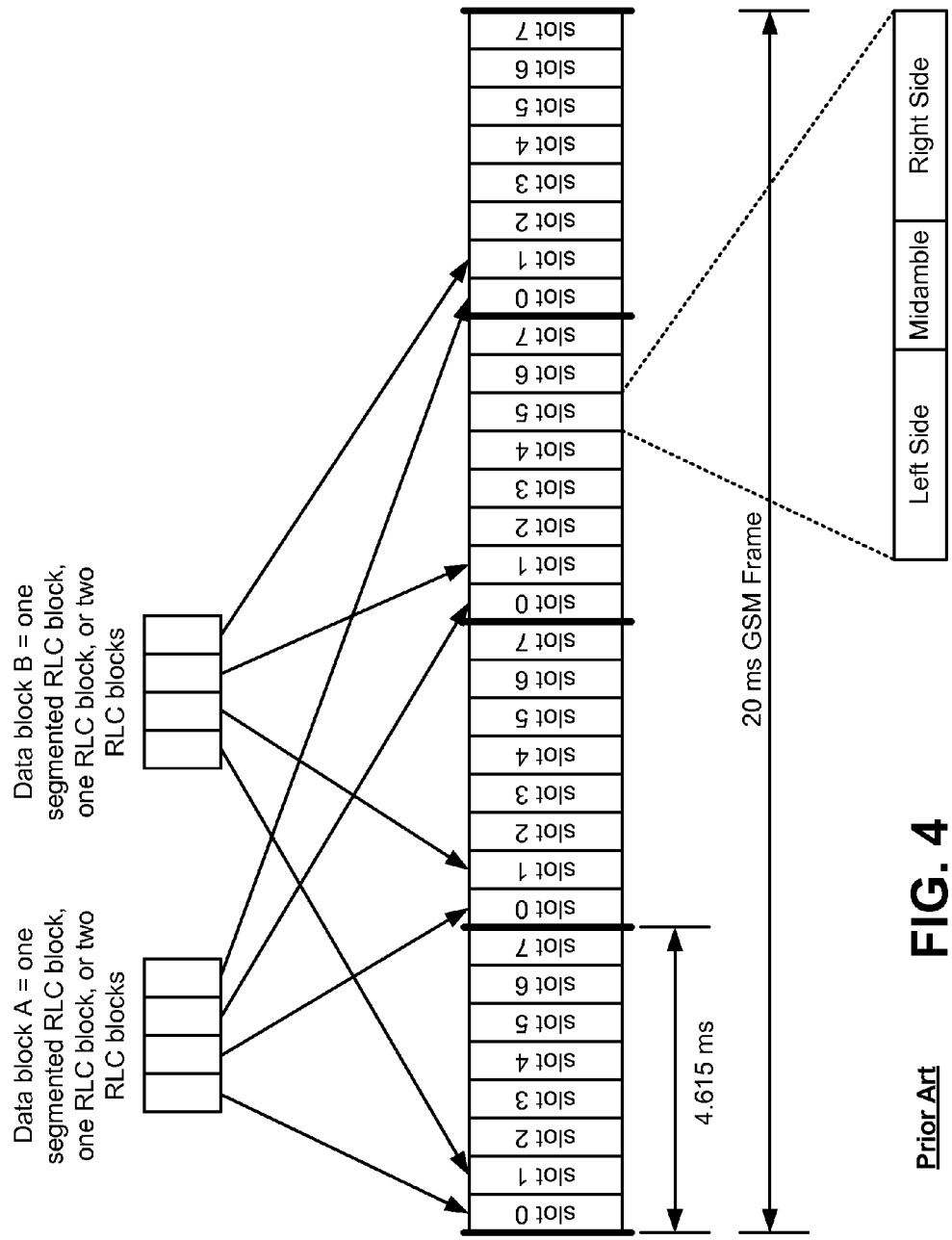
FIG. 4 is a block diagram illustrating the general structure of a GSM frame and the manner in which data blocks are carried by the GSM frame.

FIG. 4 is a block diagram illustrating the general structure of a GSM frame and the manner in which data blocks are carried by the GSM frame. The GSM frame is 20 ms in duration, is divided into quarter frames, each of which includes eight time slots, time slots 0 through 7. Each time slot is approximately 625 us in duration, includes a left side, a right side, and a midamble. The left side and right side of an RF burst of the time slot carry data while the midamble is a training sequence.

The RF bursts of four time slots of the GSM frame carry a segmented RLC block, a complete RLC block, or two RLC blocks, depending upon a supported Modulation and Coding Scheme (MCS) mode. For example, data block A is carried in slot 0 of quarter frame 1, slot 0 of quarter frame 2, slot 0 of quarter frame 3, and slot 0 of quarter frame 3. Data block A may carry a segmented RLC block, an RLC block, or two RLC blocks. Likewise, data block B is carried in slot 1 of quarter frame 1, slot 1 of quarter frame 2, slot 1 of quarter frame 3, and slot 1 of quarter frame 3. The MCS mode of each set of slots, i.e., slot n of each quarter frame, for the GSM frame is consistent for the GSM frame but may vary from GSM frame to GSM frame. Further, the MCS mode of differing sets of slots of the GSM frame, e.g., slot 0 of each quarter frame vs. any of slots 1-7 of each quarter frame, may differ.

Figure 5A:
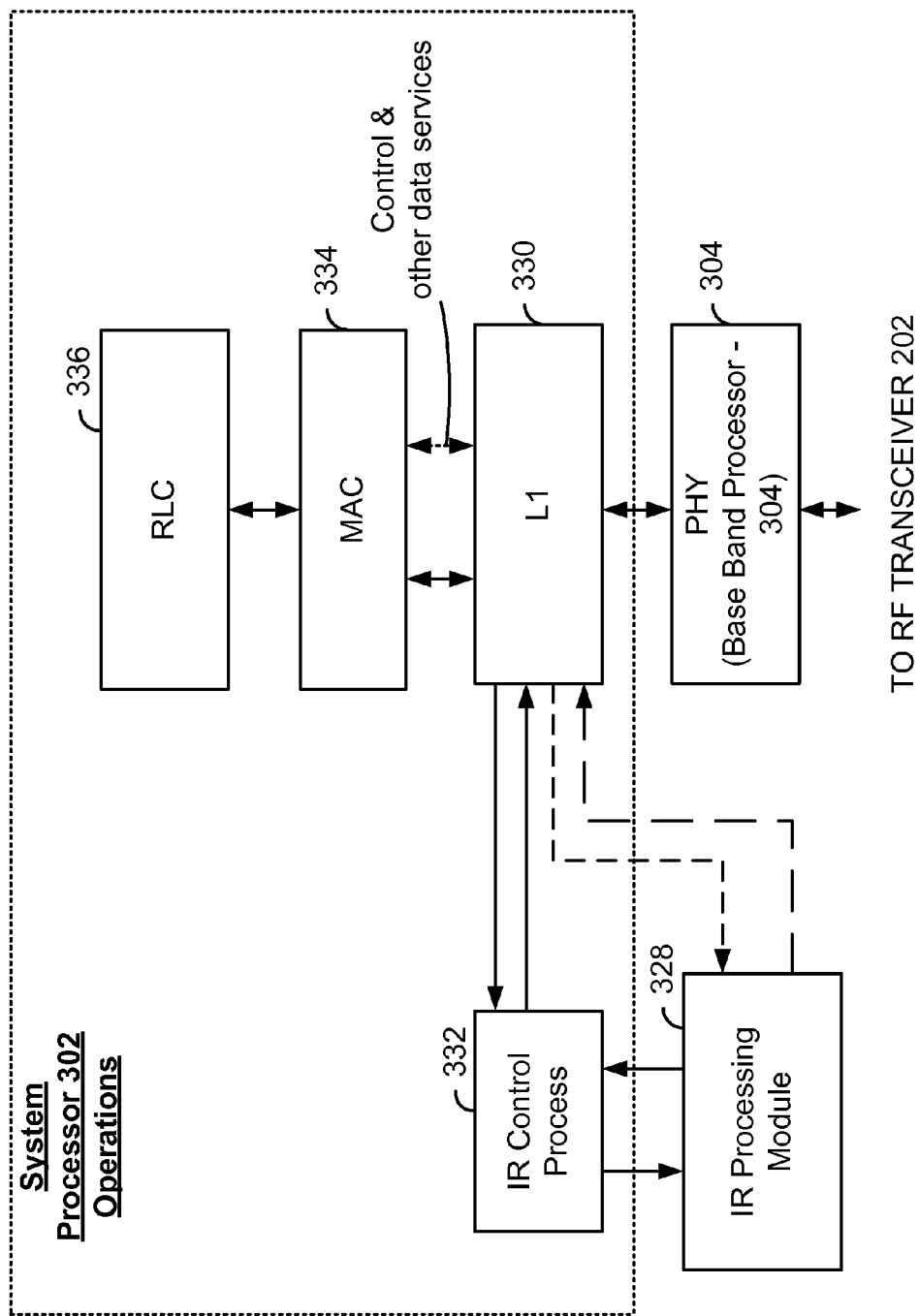
FIG. 5A is a block diagram illustrating one embodiment of the manner in which the Incremental Redundancy (IR) processing module interacts with the system processor to perform IR processing according to the present invention.

FIG. 5A is a block diagram illustrating one embodiment of the manner in which the IR processing module 328 interacts with the system processor 302 to perform IR processing according to the present invention. The illustrated portion of the EDGE protocol stack includes the RLC layer 336, the MAC layer 334, the L1 process 330, and the IR control process 332. Also shown in FIG. 5A is the IR processing module 328 and the baseband processor 304 that manages/implements the PHY in cooperation with the other components illustrated in FIG. 3.

The L1 process 330 supports data and control transactions by interacting between the PHY and the upper layers, e.g., MAC 334 layer/RLC layer 336. In performing these operations, the L1 process 330 receives data and control from the MAC layer 334, operates upon the data, and passes the data to the PHY. Likewise, the L1 process 330 receives data and control from the PHY, operates upon the data and control, and passes the data and control to the MAC 334. These operations are generally known.

According to the illustrated embodiment of the present invention, the L1 process 330 intercepts IR transactions, upstream and/or downstream, and diverts the IR transactions to the IR control process 332. The IR control process 332, in turn, performs some IR operations and controls operation of the IR processing module 328 to process the IR transactions. The IR control process 332 (in some cases in cooperation with the IR processing module 328) performs IR control, IR memory management, RLC/MAC header interpretation for IR combining, and tracking of the ARQ receiving state and received block bit map. With the IR control process 332 performing tracking of the ARQ receiving state and received block bit map, no extra messages are needed between the RLC layer 336 and the L1 layer 330 for ARQ received block synchronization. The RLC layer 336 is automatically synchronized because the L1 layer only passes correctly decoded data blocks to the RLC layer 336 (via the MAC layer 334).

In some embodiments, the IR processing module 328 acts only as a slave to the IR control process 332 operating on the system processor 302. In such case the IR control process 332 directs all operations of the IR processing module 328 and is responsible for all memory accesses. In other embodiments the IR processing module 328 has some/substantial control over IR operations and has direct access to IR memory and to main memory.

Figure 5B:
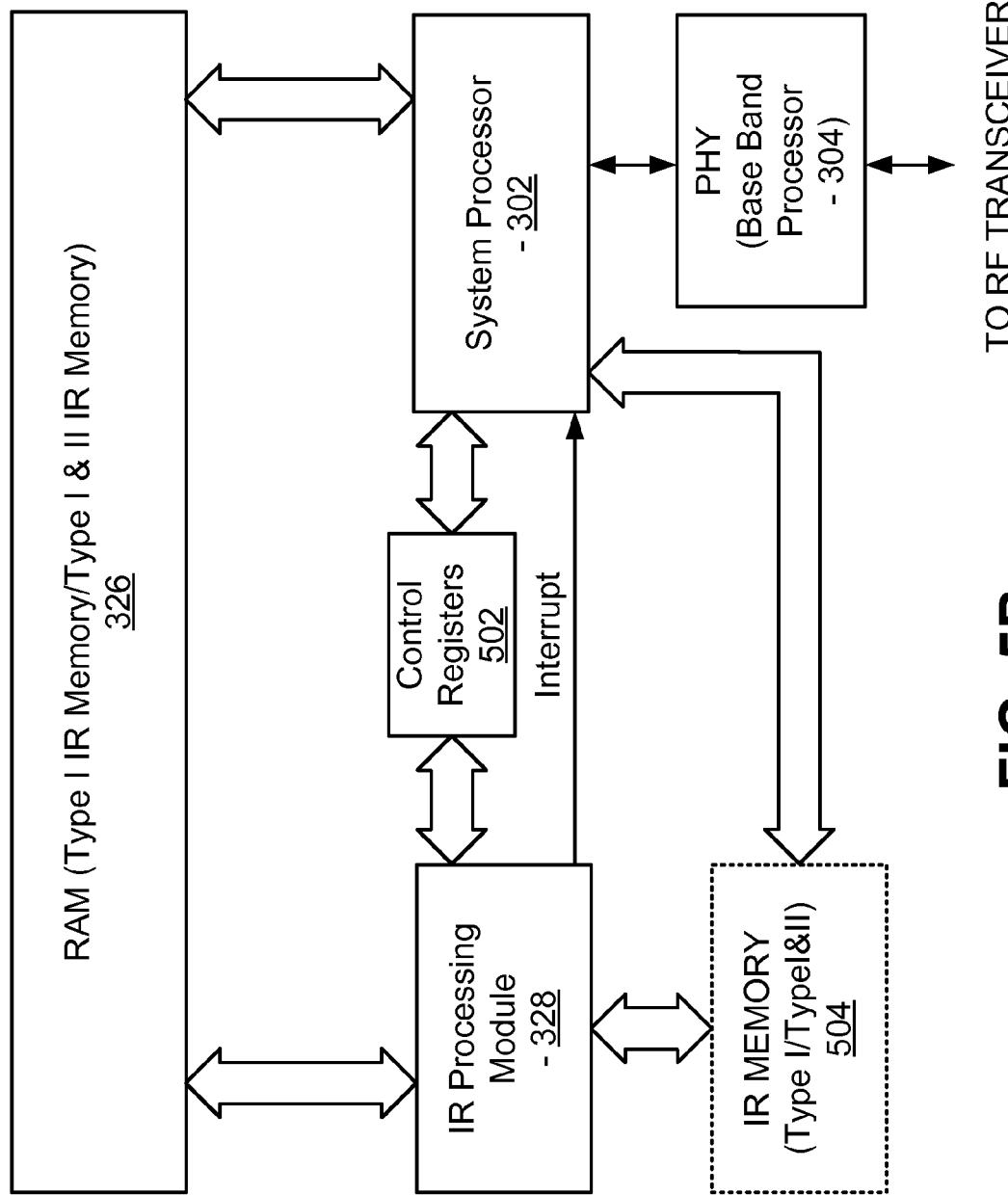
FIG. 5B is a block diagram illustrating the interconnection of the system processor and the IR processing module according to various embodiments of the present invention.

FIG. 5B is a block diagram illustrating the interconnection of the system processor 302 and the IR processing module 328 according to various embodiments of the present invention. Interrupt based command control may be used between the IR processing module 328 and the system processor 302 using control registers 502. The system processor 302 running the IR control process 332 commands the IR processing module 328 to perform specific operations, e.g., header decoding, deinterleaving, data depuncturing, soft combining, data decoding, etc., via control registers 502. In such case the IR control process 332 running on the system processor 302 has control over all IR memory accesses, passes data to the IR processing module 328, and receives data from the IR processing module 328.

The control registers 502 and one or more interrupt lines may be used to couple the IR processing module 328 to the system processor 302. In such case, when the IR processing module 328 completes it operations, it sends an interrupt to the IR control process 332 running on the system processor 302 and also writes to the control registers 502 based upon a result of its processing. The interrupt received by the system processor 302 has the highest priority (or very high priority) among other interrupts and therefore will be served first. In another embodiment, the IR processing module 328 and the system processor 302 communicate via memory reads/memory writes in RAM 326, in lieu of, or in addition to communicating via the control registers 502.

Figure 6:
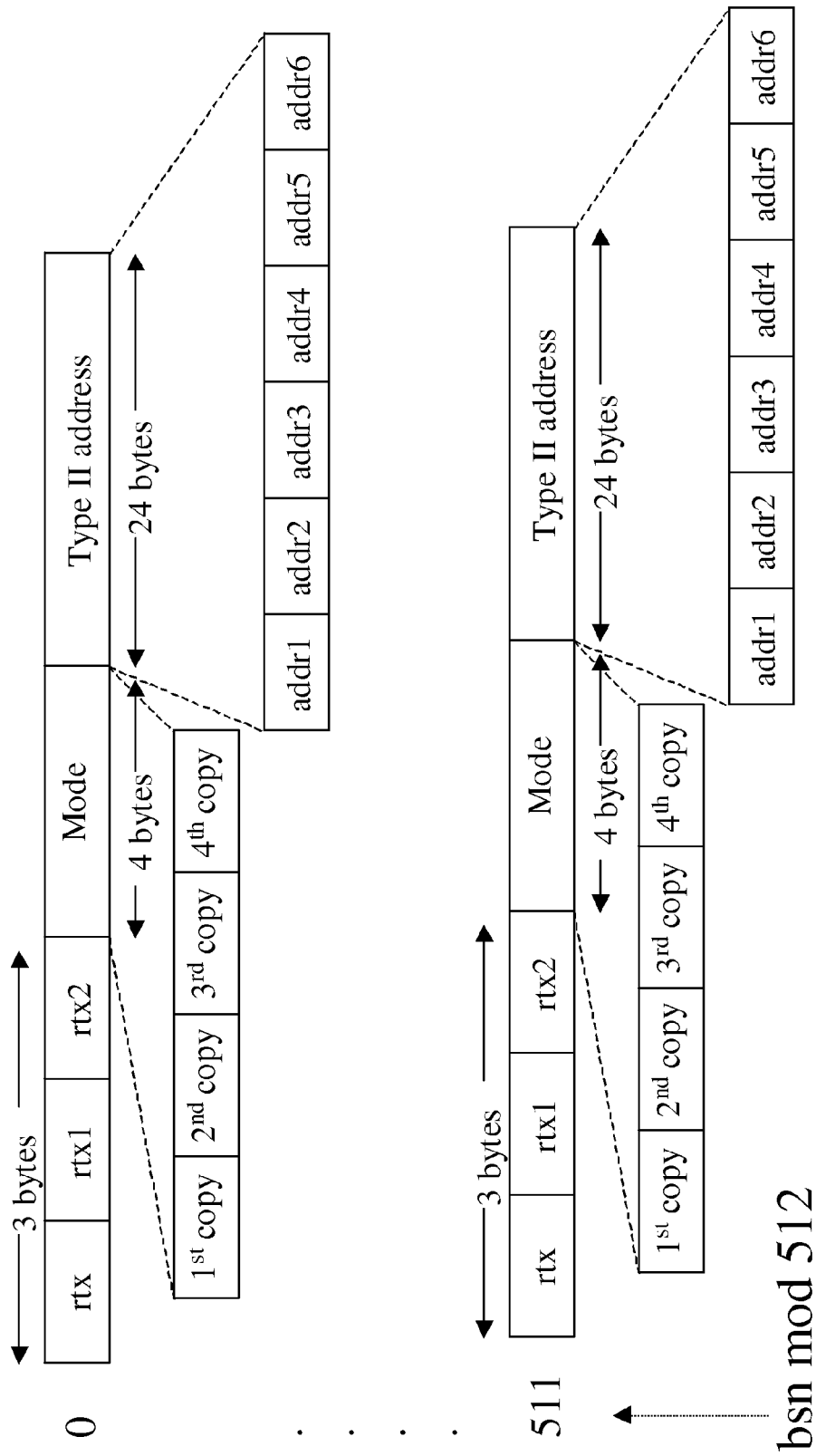
FIG. 6 is a block diagram illustrating an IR memory structure used in servicing IR operations for EDGE communications according to one aspect of the present invention.

As will be described further with reference to FIG. 6, IR memory includes Type I IR memory and Type II IR memory. Type I IR memory and/or Type II IR memory may be implemented in RAM 326. Alternately, Type I IR memory and/or Type II IR memory or may be implemented in a dedicated IR memory 504. The IR processing module 328 may interface directly to RAM 326, to a dedicated IR memory 504, or may interface with one or both via the system processor 302, depending upon the embodiment. FIG. 6 is a block diagram illustrating an IR memory structure used in servicing IR operations for EDGE communications according to one aspect of the present invention. A two level data structure enables the IR processing module 328 or system processor 302 to write/retrieve data to/from the external IR memory (e.g., RAM 322, or dedicated IR memory 504) efficiently. The IR memory includes two types of data blocks: Type I IR memory blocks and Type II IR memory blocks. Type I IR memory blocks store rtx_flags (re-transmission flag=0, . . . , 5), MCS modes, and the address(es) of corresponding Type II IR memory block(s). Retransmission flag rtx indicates a number of previous transmissions of non-segmented RLC blocks that are stored in Type II IR memory, rtx1 indicates a number of previous transmissions of a first segment of a segmented RLC blocks that are stored in Type II IR memory, and rtx2 indicates a number of previous transmissions of a second segment of a segmented RLC block that are stored in Type II IR memory. The modes stored in Type I IR memory indicate particular MCS modes for respective data blocks stored in Type II IR memory. Type II IR memory blocks hold puncturing pattern numbers, average block Signal to Interference Ratios (SIRs), padding bit information when MCS 8 to MCS 6 or MCS 8 to MCS 6 to MCS 3 mode switching is performed, and soft symbol bits of the corresponding data block.

Type II IR data memory blocks (in addition to two or more words for storage of header information) may have a size of 156 words, 316 bytes, or another size and are dynamically allocated based upon actual storage needs of the currently serviced operations. As will be described further with reference to FIGS. 7A, 7B, 7C, and 7D, data blocks (either segmented RLC blocks or full RLC blocks) for all MCS modes except MCS modes 5 and 6 can be stored in one Type II IR memory block. MCS modes 5 and 6 data blocks (1248 four-bit soft data) require two Type II IR memory blocks for storage. For each Block Sequence Number (BSN), a maximum of four (for un-segmented RLC block) or six (for segmented RLC block) Type II IR-memory blocks are allocated. The size of Type I IR memory block is 16 words for a given outstanding block.

In one embodiment of the present invention, a fixed allocation, e.g., 512, of Type I IR memory blocks is made to implement a streamlined operational process. In EDGE the BSN ranges from 0 to 2047. However for four time-slot downlink transmissions, a maximum of 512 outstanding RLC block BSNs are allowed. Thus, to enable quick access to the Type I IR memory for any given received data block BSN, 512 blocks of Type I IR memory is allocated. To obtain IR information for a received data block BSN, the IR processing module 328 simply reads Type I data in the memory (IR_base_memory+(BSN%512)*16), where IR_base_memory is the base address of the Type I IR memory. Based upon the Type I IR memory block read, the IR processing module 328 accesses the Type II IR memory block(s) for the additional information and data stored therein. When fewer or more than four time-slot downlink transmissions are allowed, the size of the Type I IR memory may be adjusted accordingly using the same concept.

This Flexible IR memory design allows storage of punctured and/or de-punctured data. Four Type II IR memory blocks may be associated with each outstanding unsegmented RLC block. Each Type II IR memory block stores soft decision bits for each previously transmitted RLC block (either punctured or de-punctured). Four Type II IR memory blocks are sufficient to encompass all puncturing patterns even with MCS mode switching for unsegmented RLC blocks. The IR memory arrangement of the embodiments of the present invention minimize the amount of memory required when only one or a few retransmissions of a data block with different puncturing patterns are required. Such is the case because, without mode switching, the maximum number of puncturing patterns is three for MCS 3 and 4 and MCS 7, 8, and 9. The de-interleaved, punctured four-bit blocks can be stored in one Type II IR memory block. In this case, only three Type II IR memory blocks will be used for each outstanding RLC block. For MCS 5 and 6, the de-interleaved, punctured 4 bit blocks (1248 in length) can be fitted into two Type II IR memory blocks. Thus, four Type II IR memory blocks can accommodate two RLC blocks with different puncturing pattern numbers, which is the case for MCS 5 and 6.

With mode switching, for example MCS 7 to 5, MCS 9 to 6, MCS 8 to 6, MCS 5 to 7, MCS 6 to 9, MCS 6 to 8, it is possible that three Type II IR memory blocks of a first MCS mode, e.g., MCS 7 or MCS 8 are used to store puncturing pattern 1, 2 and 3. While switching to a lower mode, e.g., MCS 7 to MCS 5 or MCS 8 to MCS 6, there is only one Type II IR memory block left which is not enough to store de-interleaved, punctured MCS 5 or MCS 6 mode data. At this point, the IR storage type is switched to store de-punctured soft decision data, 5 bits per symbols. In this case, the de-punctured soft decision can be equally stored in four Type II IR memory blocks. The largest number of soft symbol data bits that may be stored in Type II memory are 1836 bits (612 words), 153 words per Type II memory block.

The present invention not only supports mode switching but also supports RLC block segmentation during a Temporary Block Flow (TBF). When there is a MCS mode switch during a TBF, since the IR memory also stores header information of the outstanding blocks that were previous received, combining data from different MCS modes can be easily achieved. When an RLC block segmentation occurs (e.g. MCS 6 to MCS 3, MCS 5 to MCS 2, or MCS 4 to MCS 1), the IR processing module 328 simply erases all copies related to this RLC block in the IR memory associated with the higher mode and starts storing outstanding copies with the lower modes. In this case, IR operations can still be performed for those segmented blocks.

FIGS. 7A, 7B, 7C, and 7D are block diagrams illustrating the manner in which RLC blocks and segmented RLC blocks are stored in Type II IR memory according to one aspect of the present invention. Referring particularly to FIGS. 4 and 7A, the four slots of a GSM frame for MCS 1-3 carry either a segmented RLC block, e.g., either a first portion or a second portion of the RLC block, or a complete RLC block. MCS 1-3 modes use GMSK modulation with a data block having 372 soft symbol bits. Resultantly, the data block includes 93 soft symbol words that may be stored in a single 156-word Type II memory location. For MCS 1-3 modes in which segmented RLC blocks are carried, Rtx1 of Type I IR memory indicates a number of copies of the first segment of the corresponding RLC block that are stored in Type II IR memory while rtx2 of Type I IR memory indicates a number of copies of the second segment of the corresponding RLC block that are stored in Type II IR memory.

Referring now to FIGS. 4 and 7B, for MCS 4, the four slots of a GSM frame carry a complete RLC block. MCS 4 mode uses GMSK modulation with a data block having 372 soft symbol bits. Resultantly, the MCS 4 data block includes 93 soft symbol words that may be stored in a single 156-word Type II memory location.

Referring to FIGS. 4 and 7C, for MCS 5-6, the four slots of a GSM frame carry a complete RLC block. MCS 5-6 uses 8 PSK modulation with each data block including 1248 soft symbol bits/312 soft symbol words. The soft symbol bits of the MCS 5-6 data block are stored in two Type II IR memory locations, each 156 words in size.

Referring now to FIGS. 4 and 7D, for MCS 7-9, the four slots of a GSM frame carry two complete RLC blocks. MCS 7-9 uses 8 PSK modulation and the MCS 7-9 data block includes 612 soft symbol bits for each RLC block it carries. Thus, the 612 soft symbol bits for the RLC block equals 153 soft symbol words that may be stored in a single Type II memory location.

Figure 8:
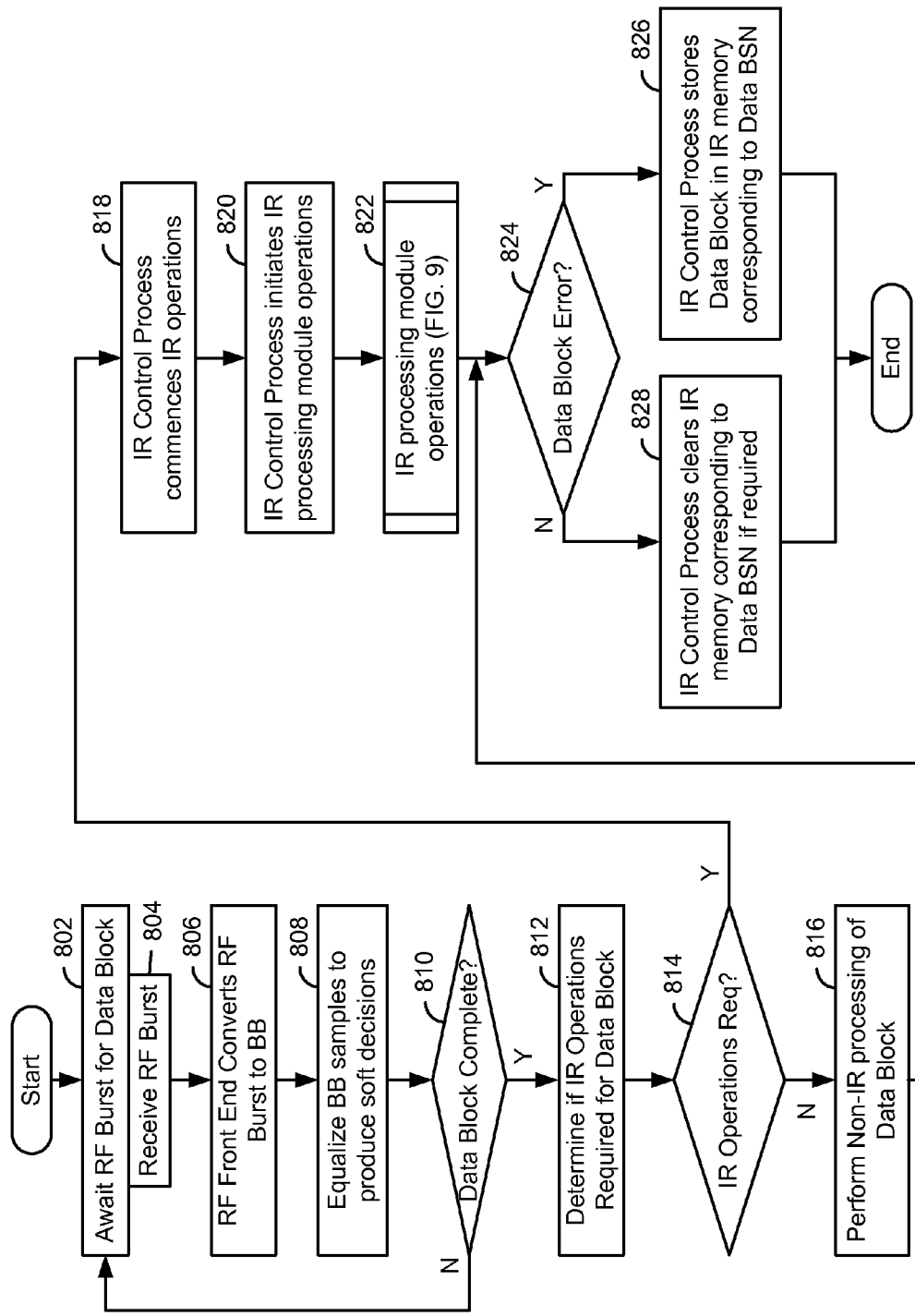
FIG. 8 is a logic diagram illustrating operation of a wireless device according to an embodiment of the present invention in performing data block decoding operations.

FIG. 8 is a logic diagram illustrating operation of a wireless device according to an embodiment of the present invention in performing data block decoding operations. Operation commences with the RF transceiver awaiting an RF burst carried within a slot of a GSM quarter frame (step 802). Upon receipt of the RF burst (step 804), the RF front end converts the RF burst to a baseband signal (step 806). Such conversion is known and is not described further herein and typically includes estimating the quality of the signal, e.g., SIR. The baseband signal is then sampled. Either the baseband processor 304 or the equalizer 318 then equalizes the baseband signal to produce soft decisions (step 808).

When a complete data block has been received (as determined at step 810) remaining operations of FIG. 8 are performed. Note that for MCS 1-3 four slots of a GSM frame may carry either a segmented RLC block or a complete RLC block. The IR operations of FIG. 8 beginning at step 812 may be optionally implemented upon the receipt of a RLC block segment so long as a copy of the complementary segment of the RLC block is already stored in IR memory. Based upon information contained in the header that is partially decoded by the baseband processor 304, the system processor 302, or the IR processing module 328, the receiving devices determines whether IR operations are required for the data block (step 812). At step 814, if IR operations are required, operation proceeds at step 816 where non-IR data processing is performed upon the data block. From step 816 operation proceeds to step 824 where data block error checking is performed.

If IR operations are required, as was determined at step 814, operation proceeds to step 818 where the IR control process 332 running on the system processor 302 enacts IR operations for the data block (step 818). The IR control process 332 interacts with the IR processing module 328 (step 820) to initiate/perform/complete the IR processing module operations (step 822). The IR operations (step 822) are described in detail with reference to FIG. 9. Depending upon the embodiment, the IR operations are performed jointly by the IR control process 332 and the IR processing module 328. The split in duties between these devices depends upon the particular embodiment.

Upon the completion of the IR processing module operations at step 822, the IR control process 302 determines whether the IR operations were successful via error checking of the decoded RLC block (step 824). Error checking performed at step 824 is done using a cyclical redundancy check, for example. If the IR operations were successful and no errors are found in the decoded RLC block the data is passed to the MAC 334/RLC 336 layers of the protocol stack operating on the system processor 302. The IR control process 332 operating on the system processor, in cooperation with the IR processing module 328, in some embodiments clears IR memory corresponding to the BSN, if required (step 828). Clearing memory corresponding to the BSN of the data block includes releasing all Type II IR memory and also overwriting any data in Type I IR memory for the BSN with null data, e.g., rtx=0, rtx=0, rtx2=0. Of course, if the data block operated upon was the first transmission of the RLC block then IR memory has no stored contents and memory clearing is not required.

If decoding of the data block results in errors, as determined at step 824, the IR control process 332, either by itself or in combination with the IR processing module 328, stores the data block in IR memory corresponding to the BSN of the data block (step 826). This operation will be described further with reference to FIG. 10.

Figure 9:
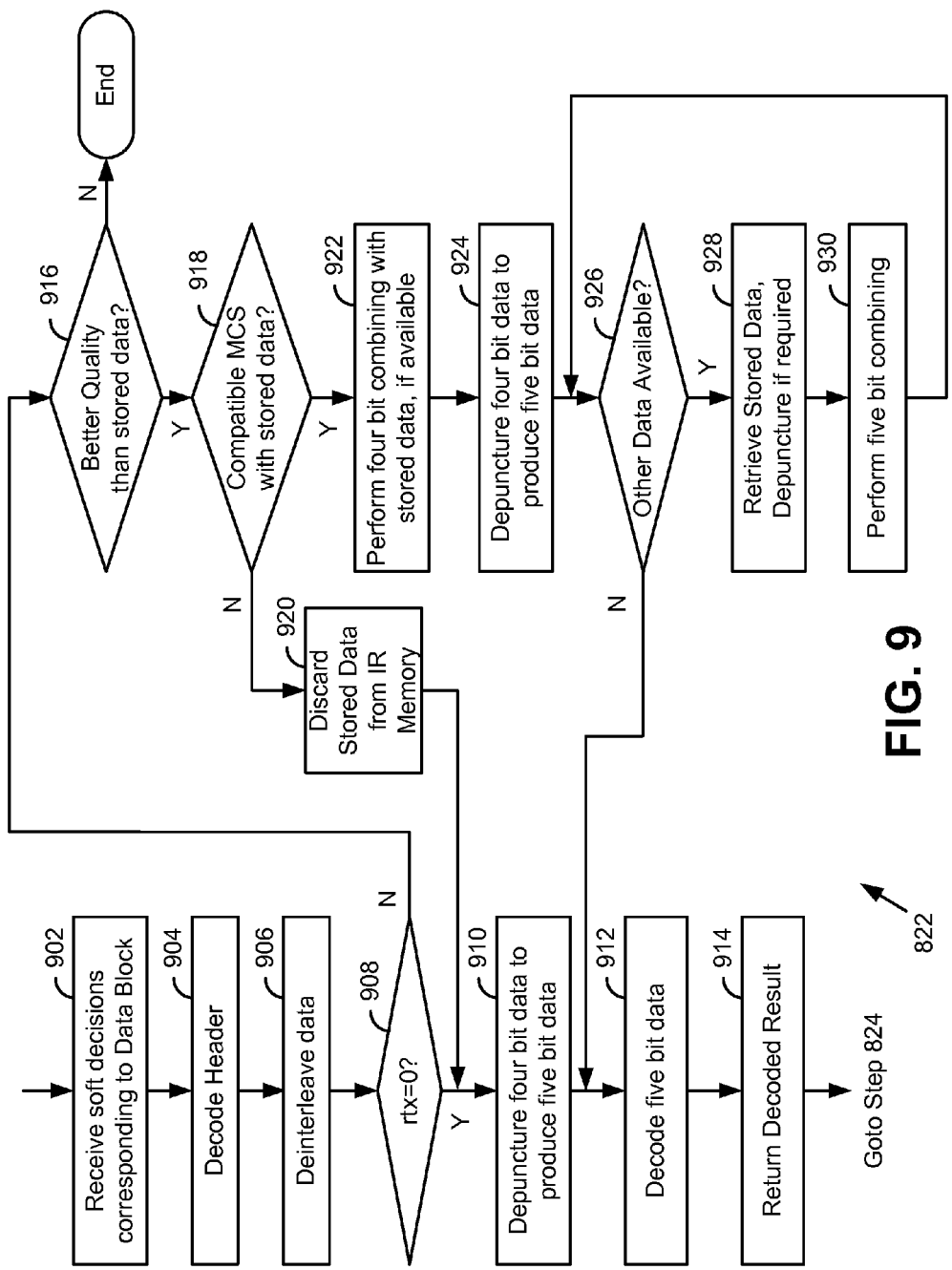
FIG. 9 is a logic diagram illustrating IR operations according to an embodiment of the present invention.

FIG. 9 is a logic diagram illustrating IR operations according to an embodiment of the present invention. The operations of FIG. 9 are referred to as being performed by the IR processing module 328 and/or the IR control process 332 implemented on the system processor 302. The responsibility for these operations described with reference to FIG. 9 is for the described embodiment only. In other embodiments the split in IR processing duties may differ without departing from the scope of the present invention.

Operation commences with the IR processing module 328 receiving soft decisions corresponding to the data block, i.e., either RLC block or segmented RLC block (step 902). As was previously described with reference to FIGS. 3, 5A and 5B, the IR processing module 328 may receive the soft decisions of the data block via a memory read and write, via control registers 502, directly from the IR control process 332 operating on the system processor 302, or via another particular operation. The IR module 328 (or IR control process 332) then decodes the soft decisions of the header to extract information regarding the data block (step 904). The decoded header will include the BSN of the data block, the MCS mode of the data block, the puncturing pattern of the data block, whether the data block carries a complete RLC block or a segmented RLC block, and additional information that may be required for IR operations. The data is then deinterleaved (step 906). In other embodiments the deinterleaving may be done earlier or later in the IR process but in all cases prior to depuncturing, soft bit combining (if required), and decoding.

Next, the IR processing module 328 (or IR control process 332) determines whether the data block is an initial transmission of the RLC block or whether the data block is a retransmission of the RLC block (step 908). Alternately, the IR processing module 328 may pass the decoded information back to the IR control process 332, which makes the determination regarding whether the data burst is a retransmission. This determination may be made by reading rtx, rtx1, and rtx2 from the Type I IR memory for the block sequence number of the data block, e.g., RLC block BSN. If this is a first transmission of the data block, e.g., rtx=0, then operation proceeds to step 910. If not, the data block is a retransmission of a previously transmitted data block, e.g., rtx>0 and operation proceeds to step 916.

For a first transmission of the data block, the IR processing module 328 depunctures the deinterleaved data block (step 910). In depuncturing the data block the IR processing module converts the soft symbols from four-bit data to five-bit data. Because depuncturing requires that non-received data be inserted into a bit sequence, which is essentially data with no reliability. Soft decisions of the received data block that are represented in the four-bit format as produced by the equalization process have a reliability or confidence factor included therewith. For example, a very confident soft decision for a binary 1 may be represented as a 1111 while a very unconfident soft decision for a binary 1 may be represented as a 1000. Likewise, a very confident binary 0 soft decision may be represented as 0111, while a very unconfident binary 0 soft decision may be represented as 0000. Alternately, a very confident binary 0 soft decision may be referenced as 0000, while a very unconfident binary 0 soft decision may be represented as 0111. In either case, in the depuncturing operation wherein non-received data is inserted, the inserted soft decision bits have a lowest confidence that may be represented. The four-bit data is expanded based upon its confidence level such that a confident binary one, represented as four-bit nibble 1111 may be extended to a very confident five-bit sequence of 11111 or 11110, for example.

After the depuncturing process is complete the IR processing module 328 decodes the five-bit data (step 912) and then returns the decoded result to the IR control process 332 (step 914). From step 914 operation returns to step 824 of FIG. 8.

When the data block considered at step 908 is not the first transmission of the data block, e.g., rtx>0, rtx1>0, or rtx2>0, operation proceeds from step 908 to step 916 where the quality of the currently received data block is considered. If the IR module 328 (or IR control process 332) determines that the quality of the data received is no better than the quality of the data it has already stored in IR memory, no decoding is performed for the received data block and operation ends without either attempting decoding on the data block or storing the currently received data block. The SIR associated with the received data or other quality indications, such as the relative certainty of the soft decisions, may be used as a threshold to determine whether decoding should be attempted.

If the quality of the currently received data block justifies an additional decoding for the data block (or combined data block created therewith), as determined at step 916, the IR processing module 328 or IR control process 332 operation proceeds to step 918. At step 918, the IR control process 332 or IR processing module 328, based upon the information in the decoded header and information contained in the Type I IR memory, determines whether the MCS mode of the received data block is incompatible with previously stored data block(s).

As is known, the MCS modes of the EDGE standard include a number of families. A first family includes MCS 9, MCS 8, MCS 6, and MCS 3. A second family includes MCS 7, MCS 5, and MCS 2. Finally, a third family includes MCS 4 and MCS 1. During normal operations, copies of a particular data block be transmitted using MCS modes within a common MCS family so that the retransmitted copies of the data block may be combined to produce combined data blocks that are more likely to be correctly decoded. Thus, for example, if an MCS 9 mode is used for the first transmission, an MCS 6 mode with puncturing pattern 1 is used for a second transmission, and an MCS 6 mode with puncturing pattern 2 is used for a third transmission, all transmitted data block copies may be combined.

Not all MCS modes or transmissions therein are compatible. Further, the size of the Type II IR memory for the particular BSN may not be large enough to store all compatible transmissions. Further, initial transmissions may include complete RLC blocks and subsequent transmissions may include segmented RLC blocks. For example, if a first transmission occurs using MCS 9, a second using MCS 6, and a third using MCS 3, the MCS 9 and MCS 6 data will be discarded upon receipt of the MCS 3 data. Further, if the initial transmission includes split RLC blocks, e.g., MCS 3, a subsequent transmission in the same family that does not segment data blocks, e.g., MCS 6, will be incompatible. Thus, in such case, the stored data for the prior MCS 3 transmissions would be deleted. If the currently received data block is of an MCS mode that is incompatible with stored data blocks, previously stored data in IR memory is discarded by clearing the Type I IR memory corresponding to the BSN of the data block (step 920). Then, the currently received data block is processed as if it was the first transmission for the data block.

When the retransmitted data block is of a compatible MCS mode, as determined at step 918, four-bit combining with stored data is performed for the received data if possible (step 922). The operations for four-bit combining are performed when a stored data block and the received data block (with the same BSN) have the same MCS mode and the same puncturing pattern. Four-bit combining may be done based upon the quality of the respective bursts, e.g., SIR, or other considerations in an attempt to produce a signal having a superior quality as compared to the separate transmissions.

After the four-bit combining has been performed, if possible, four-bit data is depunctured to produce five-bit data (step 924). After the depuncturing is performed, it is determined whether the five-bit data may be combined with one or more stored copies of the data block (step 926). If a stored copy of the data block may be combined with the current data block, the stored data block is retrieved (step 928). If the stored data block is in a four-bit format, it is depunctured (step 928 also). If the stored data block is stored in a five-bit format, depuncturing is not required. The retrieved data block, in a five-bit format, is then combined with the current five-bit data block in a five-bit combining operation (step 930). Operation returns to step 926 where additional stored data is considered for five-bit combining. If additional stored data block(s) are available for five-bit combining, steps 928 and 930 are repeated for the additional data block(s). When all data blocks has been five-bit combined, as determined at step 926, operation proceeds to step 912 wherein decoding is performed and then to step 914 where the decoded result is returned.

Figure 10:
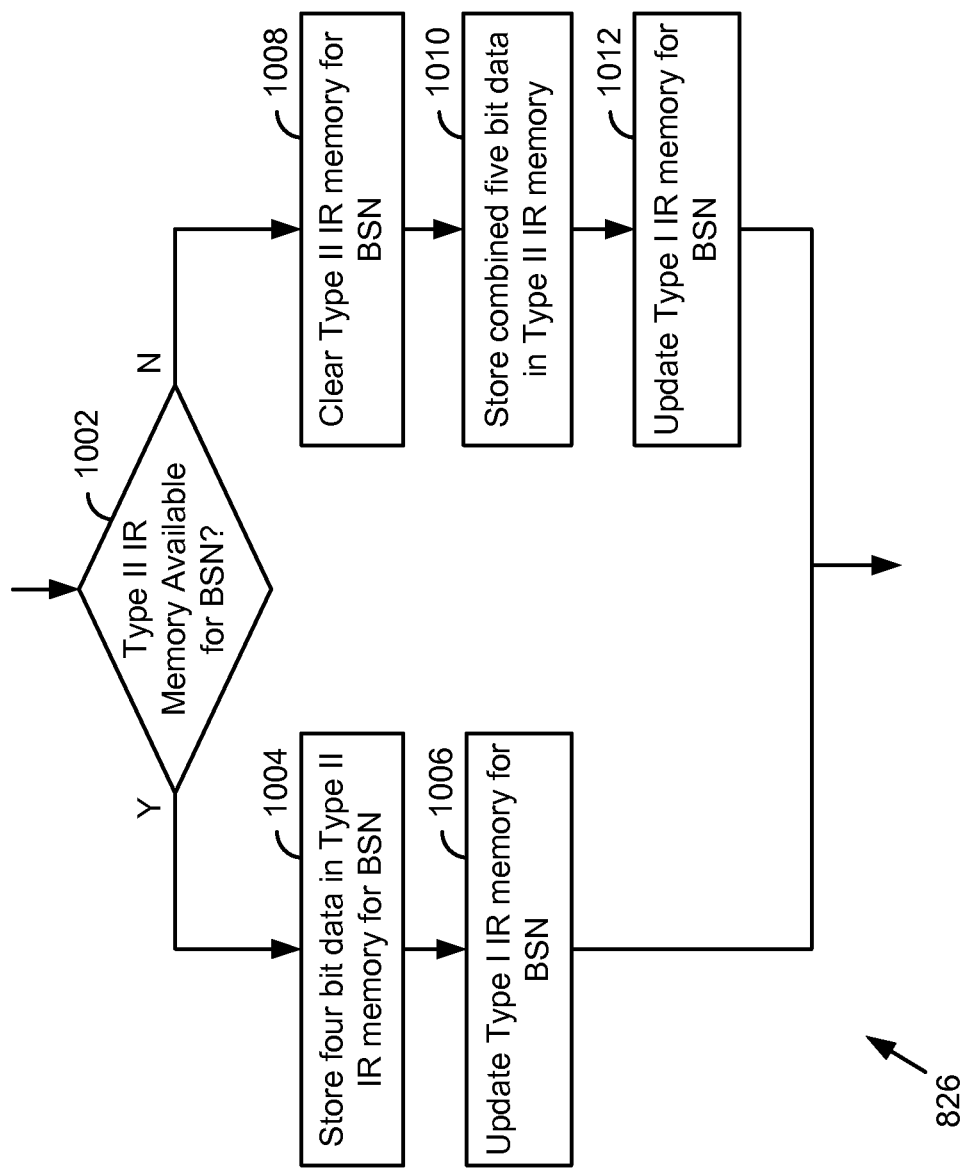
FIG. 10 is a logic diagram illustrating operation in storing data in IR memory according to an embodiment of the present invention.

FIG. 10 is a logic diagram illustrating operation in storing data in IR memory according to an embodiment of the present invention. Data may be stored in Type II IR memory in either a four-bit format or a five-bit format. While a four-bit format for storage is preferred to minimize the size of the Type II IR memory no data is lost when storing the data in a five-bit format. As the reader should appreciate, in IR operations a number of copies of a data block may be received, each having a different MCS mode and/or a different puncturing pattern. After a number of data block receipts without a successful decode, the amount of data requiring storage may be large. According to one aspect of the present invention the size of the IR memory is limited for each BSN based upon practical memory limitations. To address this limitation, the IR operations of the present invention support the storage of a combined result (or a plurality of received data blocks) that is in a five-bit format.

Referring particularly to FIG. 10, when storage of a data block is required, the IR control process 332 or IR processing module 328 determines whether Type II IR memory is available for the BSN (step 1002). If Type II IR memory is available for the BSN the IR control process 332 or IR processing module 328 stores the data block in a four bit format in Type II IR memory corresponding to the BSN (step 1004). The IR control process 332 or IR processing module 328 then updates the Type I IR memory for the BSN according to the data stored, i.e., update rtx, rtx1, or rtx2, mode (for the stored copy), MCS mode (for the stored copy), and Type II IR memory address (for the stored copy) (step 1006).

If no additional Type II IR memory is available for the BSN (as determined at step 1002), the IR control process 332 clears all Type II IR memory locations for the BSN, or all except for the Type II IR memory that will be used in the current storage operation (step 1008). The IR control process 332 then stores the combined five-bit result in Type II IR memory (step 1010) and updates Type I IR memory for the BSN accordingly (step 1012).

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

The invention claimed is:

1. A wireless device for implementing Incremental Redundancy (IR) operations, comprising:
   a memory dedicated to store data related to the IR operations of the wireless device, the memory including:
      a Type I IR memory adapted to store IR status information of a Radio Link Control (RLC) data block; and
      a Type II IR memory adapted to store the RLC data block.

2. The wireless device of claim 1, wherein the IR status information includes retransmission information regarding the RLC data block, a Type II IR memory address for each stored copy of RLC data block, and Modulation and Coding Scheme (MCS) mode information for each stored copy of the RLC data block.

3. The wireless device of claim 2, wherein the retransmission information includes a retransmission flag indicating a number of previous transmissions of the RLC data block.

4. The wireless device of claim 1, wherein the Type II IR memory stores soft decision bits of the RLC data block, a puncturing pattern of the soft decision bits of the RLC data block, and a signal quality indicator of the soft decision bits of the RLC data block.

5. The wireless device of claim 3, wherein Type II IR memory is adapted to store either punctured soft decision bits or de-punctured soft decision bits of the RLC data block.

6. The wireless device of claim 5, wherein punctured soft decision bits are represented by a first number of bits per symbol and de-punctured soft decision bits are represented by a second number of bits per symbol, wherein the second number is greater than the first number.

7. The wireless device of claim 5, wherein the punctured soft decision bits are represented by four bits per symbol and the de-punctured soft decision bits are represented by five bits per symbol.

8. The wireless device of claim 1, wherein Type I IR memory is addressed based upon a block sequence number of the RLC data block.

9. The wireless device of claim 1, wherein the Type II IR memory is operable to store soft decision bits formed by combining soft decision bits of multiple received copies of the RLC data block.

10. The wireless device of claim 1, wherein the Type II IR memory includes a plurality of memory blocks, and wherein no more than two of the memory blocks are allocated to each RLC data block.

11. The wireless device of claim 10, wherein no more than four of the memory blocks are allocated to store previous and current transmissions of the RLC data block.

12. A method for storing data related to Incremental Redundancy (IR) operations of a wireless device, the wireless device including a memory dedicated to store data related to the IR operations, the memory including a Type I IR memory and a Type II IR memory, the method comprising:
storing IR status information regarding a Radio Link Control (RLC) data block in the Type I IR memory;
allocating the Type II IR memory for the RLC data block;
storing an address of the allocated Type II IR memory in the Type I IR memory; and
storing at least a portion of soft decision bits of the RLC data block in the allocated Type II IR memory.

13. The method of claim 12, wherein the IR status information includes retransmission information regarding the RLC data block and Modulation and Coding Scheme (MCS) mode information for each stored copy of the RLC data block.

14. The method of claim 12, further comprising:
storing a puncturing pattern of the soft decision bits of the RLC data block and a signal quality indicator of the soft decision bits of the data block in the allocated Type II IR memory.

15. The method of claim 12, further comprising:
addressing the Type I IR memory based upon a block sequence number of the RLC data block.

16. The method of claim 12, wherein the storing at least a portion of soft decision bits of the RLC data block in the allocated Type II IR memory further includes:
storing soft decision bits formed by combining soft decision bits of multiple received copies of the RLC data block in the allocated Type II IR memory.

17. The method of claim 12, wherein the allocating the Type II IR memory for the RLC data block further includes:
allocating no more than two memory blocks of the Type II IR memory for the RLC data block.

18. The method of claim 12, wherein the allocating the Type II IR memory for the RLC data block further includes:
allocating no more than four memory blocks of the Type II IR memory for storage of previous and current transmissions of the RLC data block.

19. The method of claim 18, wherein the storing at least a portion of soft decision bits of the RLC data block in the allocated Type II IR memory further includes storing punctured soft decision bits of the RLC data block in the allocated Type II memory; and further comprising:
determining when a mode switch from a higher Modulation and Coding Scheme (MCS) to a lower MCS of the RLC data block occurs;
determining a first number of memory blocks of the Type II memory that are needed for the lower MCS;
determining a second number of the four memory blocks of the Type II memory for the RLC data block that remain unallocated;
comparing the first number to the second number;
if the first number is greater than the second number, switching an IR storage type of the memory blocks of the Type II memory for the RLC data block to store de-punctured soft decision bits of the RLC data block.

20. The method of claim 12, further comprising:
determining when an RLC block segmentation from a higher Modulation and Coding Scheme (MCS) to a lower MCS of the RLC data block occurs;
erasing all copies related to the RLC data block associated with the higher MCS stored in the Type II IR memory; and
storing outstanding copies related to the RLC data block associated with the lower MCS in the Type II memory.

* * * * *